US008213933B2

(12) United States Patent
Lee

(10) Patent No.: US 8,213,933 B2
(45) Date of Patent: Jul. 3, 2012

(54) WIRELESS COMMUNICATION BETWEEN A BASE STATION AND A MOBILE DEVICE

(75) Inventor: Anthony S. Lee, San Diego, CA (US)

(73) Assignee: VIA Telecom, Inc., San Diego, CA (US)

( * ) Notice: Subject to any disclaimer, the term of this patent is extended or adjusted under 35 U.S.C. 154(b) by 358 days.

(21) Appl. No.: 12/434,003

(22) Filed: May 1, 2009

(65) Prior Publication Data

US 2010/0279683 A1    Nov. 4, 2010

(51) Int. Cl.
*H04W 4/00* (2009.01)
(52) U.S. Cl. .......... 455/434; 455/574; 455/343; 455/69; 455/458
(58) Field of Classification Search .................. 455/458, 455/574, 434, 414.2
See application file for complete search history.

(56) References Cited

U.S. PATENT DOCUMENTS

| 5,752,202 | A  | * | 5/1998  | Obright         | 455/574   |
| 6,108,542 | A  | * | 8/2000  | Swanchara et al.| 455/434   |
| 2005/0054389 | A1 | * | 3/2005  | Lee et al.      | 455/574   |
| 2007/0238448 | A1 | * | 10/2007 | Gallagher et al.| 455/414.2 |
| 2008/0004044 | A1 | * | 1/2008  | Simpson et al.  | 455/458   |

OTHER PUBLICATIONS

Woo Jin Jung; Hyung Joo Ki; Tae-Jin Lee; Min Young Chung, "Adaptive sleep mode algorithm in IEEE 802.16e," Communications, 2007. APCC 2007. Asia-Pacific Conference on, vol., No., pp. 483-486, Oct. 18-20, 2007.*

* cited by examiner

*Primary Examiner* — Jinsong Hu
*Assistant Examiner* — Benjamin Morales Fernandez
(74) *Attorney, Agent, or Firm* — Richard K. Huffman; James W. Huffman

(57) ABSTRACT

System and method for wirelessly communicating between a base station and a mobile device. The base station wirelessly sends a first one or more overhead messages to the mobile device. The first one or more overhead messages may include at least one parameter. The mobile device may wirelessly receive the first one or more overhead messages from the base station, including the at least one parameter. The base station may wirelessly send a second one or more messages to the mobile device according to a schedule based on the at least one parameter. The mobile device may wirelessly receive the second one or more messages according to the schedule based on the at least one parameter. The mobile device may schedule a sleep cycle based on the at least one parameter, which may reduce battery consumption in the mobile device. The second one or more messages may be sent less frequently than the first one or more overhead messages.

12 Claims, 3 Drawing Sheets

WIRELESS COMMUNICATION BETWEEN A BASE STATION AND A MOBILE DEVICE

FIELD OF THE INVENTION

The present invention relates to wireless communication, and more specifically to a system and method for wireless communication between a base station and a mobile device.

DESCRIPTION OF THE RELATED ART

Wireless communication has become increasingly widespread in recent times. In particular, use of mobile devices such as cellular telephones has become ubiquitous. Typical cellular networks include macro base stations or cellular towers for facilitating communication between mobile devices. As part of the various wireless communications standards and technologies, communication between a macro base station and a mobile device typically includes sending configuration and other overhead information from the macro base station to the mobile device. Typically, these overhead messages are sent together periodically, at a predetermined interval, in order to maintain an up-to-date communication link between the mobile device and the macro base station. The mobile device may operate in 'slotted mode' or 'sleeping mode' in between the timeslots in which these overhead messages are expected in order to save battery, and 'wake up' in order to receive the overhead messages at the time slots when the overhead messages are expected. Since many of the overhead messages may be necessary for the mobile device to receive a page (e.g., an incoming call) and/or set up an outgoing communication, the period at which the overhead messages are received is typically relatively short.

At the same time, as technology has developed and standards have matured, the number of overhead messages has increased to enable additional possibilities and account for various configuration requirements. For example, the development and use in cellular networks of access point base stations, or femtocells, may require additional messages to be sent from a base station to a mobile device. However, sending more overhead messages increases the configuration time for each active or waking slot, which both decreases battery life (i.e., less time can be spent in battery-saving sleep mode), and increases the amount of time before the mobile device can access the cellular network (e.g., to set up an outgoing call). Thus, improvements in the field are desired.

SUMMARY OF THE INVENTION

Embodiments are presented of a system and method for wireless communication between a base station and a mobile device. The embodiments presented comprise a method for sending messages from a base station to a mobile device, and a base station apparatus that implements the method. The embodiments also comprise a method for operating a mobile device, and a mobile device that implements the method.

The method for sending messages from a base station to a mobile device may include the base station wirelessly sending a first one or more overhead, or configuration, messages to the mobile device. The first one or more overhead (or configuration) messages may be critical to communication between the base station and the mobile device. The first overhead message(s) may include at least one parameter.

The base station may wirelessly send a second one or more messages to the mobile device according to a schedule based on the at least one parameter. The second one or more messages may be non-critical to communication between the base station and the mobile device. The second message(s) may be sent less frequently than the first message(s).

The second messages may inform the mobile device whether a femtocell (or access point base station) is within range of the mobile device, e.g., may include an "access point identifier message" and an "access point pilot information message"; the second messages may also or alternatively include other messages, including messages unrelated to femtocells. The mobile device may schedule its slotted mode operation, or a sleeping cycle, based on the at least one parameter; this may reduce the battery consumption of the mobile device.

Several advantages of the system and method as described herein lie in the fact that the second message(s) are sent separately and less frequently than the first overhead message(s), whereas in prior art systems, all messages would be sent as a single block of messages (e.g., the first messages), and would be sent relatively frequently. By separating the messages into those that are critical-to-communication (or, alternatively, those which it is advantageous to send relatively frequently) and non-critical-to-communication (or, alternatively, those which can be sent relatively infrequently), and sending the non-critical messages separately and less frequently than the critical messages, the mobile device spends less time actively receiving overhead messages and updating configuration information. In other words, the sending of the non-critical messages less frequently results in fewer overall overhead messages.

Because of this, the mobile device may be able to spend more time in 'sleep' mode (saving battery) and may also be able to send messages more quickly (improving performance).

The method for sending messages from a base station to a mobile device may be implemented by a base station apparatus. For example, in one embodiment, the base station apparatus may include at least an antenna, and logic coupled to the antenna. The logic may implement the method as described above.

The method for operating a mobile device may include the mobile device wirelessly receiving a first one or more overhead, or configuration, messages from a base station. The first one or more overhead (or configuration) messages may be critical to communication between the base station and the mobile device. The first overhead message(s) may include at least one parameter. The mobile device may also wirelessly receive a second one or more messages according to a schedule based on the at least one parameter. The second one or more messages may be non-critical to communication between the base station and the mobile device. The second message(s) may be sent less frequently than the first message(s).

The second messages may inform the mobile device whether a femtocell (or access point base station) is within range of the mobile device, e.g., may include an "access point identifier message" and an "access point pilot information message"; the second messages may also or alternatively include other messages, including messages unrelated to femtocells. The mobile device may schedule its slotted mode operation, or a sleeping cycle, based on the at least one parameter; this may reduce the battery consumption of the mobile device.

The method may include similar advantages as the method described above. In other words, by receiving the second messages separately and less frequently than the first messages, the mobile device may be able to spend more of its slotted mode in the "sleep" slots (saving battery) and may also be able to send messages more quickly (improving performance).

The method for operating a mobile device may be implemented by a mobile device apparatus. For example, in one embodiment, the mobile device apparatus may include at least an antenna, and logic coupled to the antenna. The logic may implement the method as described above.

BRIEF DESCRIPTION OF THE DRAWINGS

A better understanding of the present invention can be obtained when the following detailed description of the preferred embodiment is considered in conjunction with the following drawings, in which.

Figure 1:
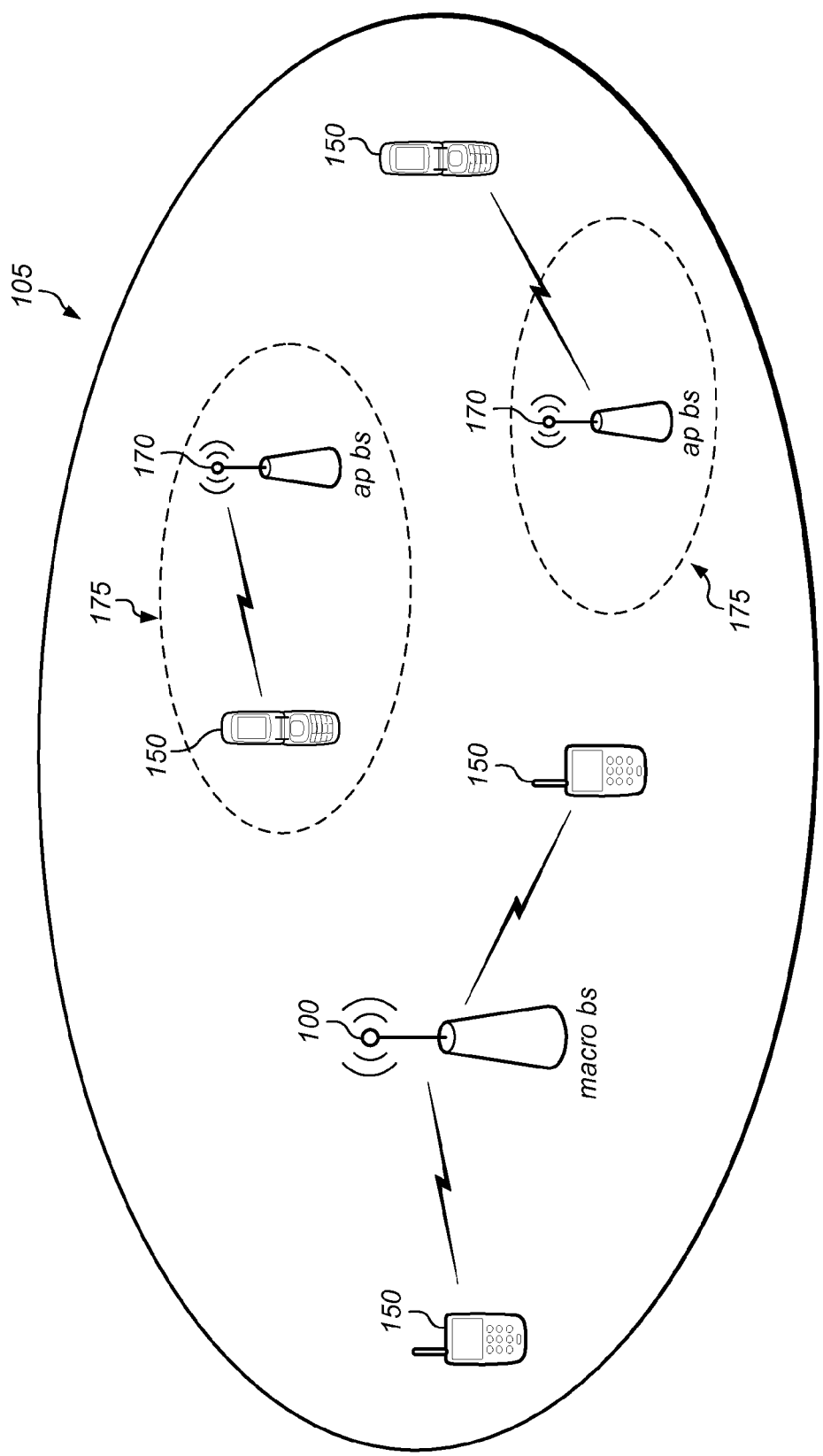
FIG. 1 illustrates an exemplary communication system according to one embodiment.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

FIG. 1—Exemplary Communications System

FIG. 1 illustrates an exemplary communication system including a macro base station 100 which provides service in macro area 105, a plurality of access point base stations 170 which provide service in local areas 175, and a plurality of mobile devices 150 (also referred to as "mobile stations" or "access terminals").

The term "access point base station" is intended to include typical definitions (as known by those of skill in the art) of femtocells, home base stations, personal access points (PAPs), and personal 2G-3G (or nG) base stations, among others. Similarly, the term "macro base station" is intended to include typical definitions (as known by those of skill in the art) of cell phone towers and base stations which provide service in a macro area. The term "base station" is intended to include both access point base stations and macro base stations among other types of base stations, as desired. Thus, a base station may include at least an antenna for transmitting and/or receiving wireless signals, and logic (such as a processor and memory medium, an application specific integrated circuit (ASIC), or a programmable hardware element, among other forms of analog or digital logic) for performing various signal related functions, such as those described below with respect to FIGS. 2 and 3.

The mobile devices (also referred to as "access terminals") 150 may include any type of device which may be used in a cellular network, e.g., for RF communication. The mobile devices may include cellular (or cell) phones (including smart phones), personal digital assistants (PDAs) with mobile communication capabilities, laptops or computer systems with mobile communication components, and/or any device that is operable to communicate with a cellular network. The mobile devices may also include at least an antenna for transmitting and/or receiving wireless signals, and logic (such as a processor and memory medium, an application specific integrated circuit (ASIC), or a programmable hardware element, among other forms of analog or digital logic) for performing various signal related functions, such as those described below with respect to FIGS. 2 and 3, and similar (though typically not identical) to the base stations described above. The mobile devices may use various different protocols, e.g., CDMA2000 (1xRTT and EV-DO), UMB, UMTS, LTE, WiMax, or others). Correspondingly, the base stations 100 and 170 may support any or at least a subset of the protocols used by the mobile devices, e.g., without modification to the standards or protocols for supporting existing mobile devices.

Figure 2:
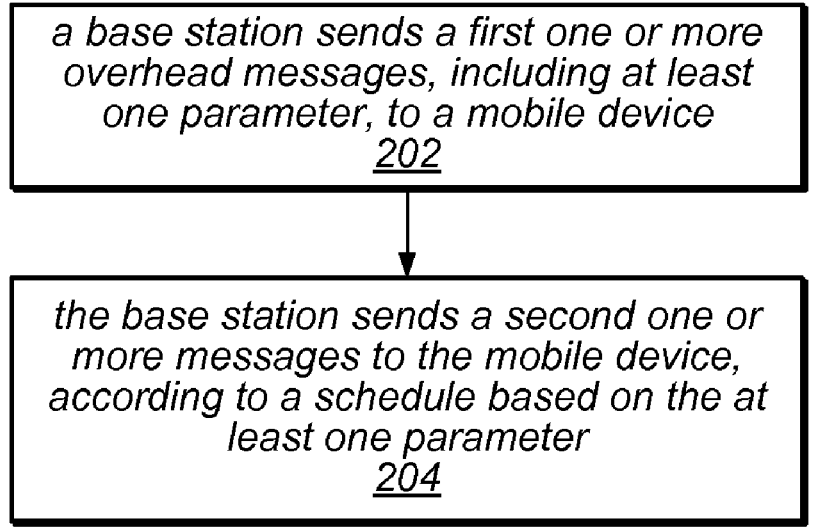
FIG. 2 is a flowchart diagram illustrating a method for sending messages from a base station to a mobile device according to one embodiment.
Figure 3:
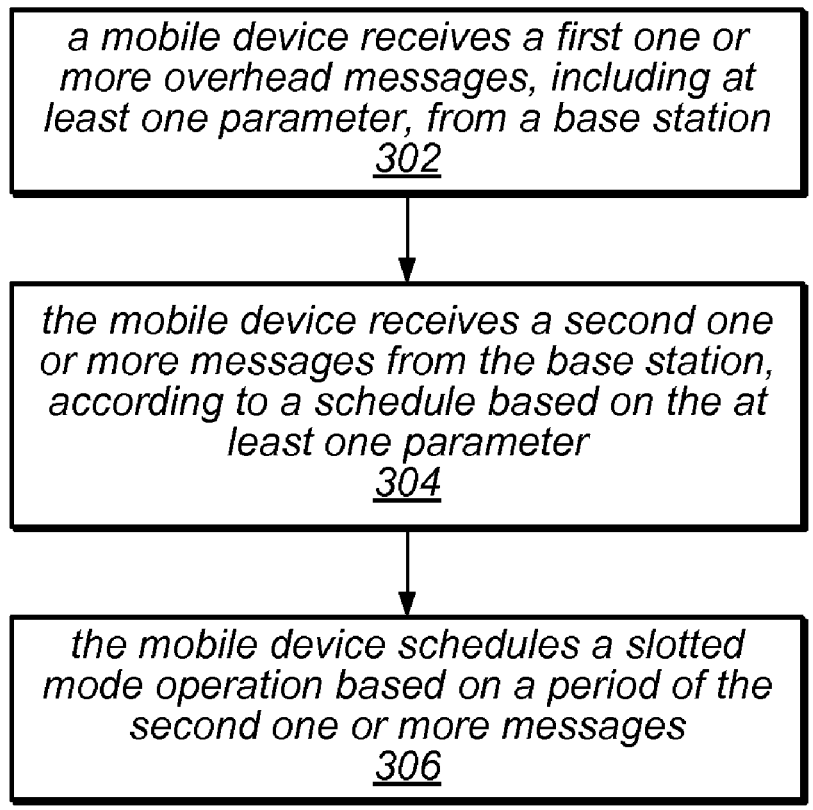
FIG. 3 is a flowchart diagram illustrating a method for operating a mobile device according to one embodiment.

FIGS. 2 and 3—Method for Sending Messages from a Base Station to a Mobile Device and Method for Operating a Mobile Device FIG. 2 illustrates a method for sending messages from a base station to a mobile device according to one embodiment. FIG. 3 is a flowchart diagram illustrating a method for operating a mobile device according to one embodiment. The methods used in FIGS. 2 and 3 may in some embodiments be used in conjunction, as described below. The base station and the mobile device may communicate wirelessly, e.g., each using an antenna to transmit signals to or receive signals from the other. As noted with respect to FIG. 1, both the base station and the mobile device may include at least an antenna for transmitting and/or receiving signals as well as logic for performing various signal related functions, such as those described below. The base station could be a macro base station or an access point base station, e.g., depending on the location of the mobile device and the relative signal strength of any base stations within range of the mobile device. Alternatively, the base station could be any type of base station.

In some embodiments, normal operation of a mobile device may include a "slotted mode". In a slotted mode, the mobile device may dedicate different specific timeslots to different activities. For example, there may be one or more specified timeslots for receiving certain messages, and/or for sending certain messages. When the mobile device is not in one of these active timeslots, it may be able to enter a "sleep" mode or cycle to save battery. In some embodiments, the timeslots may be based on a system clock, e.g., a clock that synchronizes operation between the mobile device and a base station with which it communicates, and/or the cellular network it is part of.

In 202, a base station sends a first one or more overhead messages, including at least one parameter, to a mobile device. In 302, a mobile device receives a first one or more overhead messages, including at least one parameter, from a base station. In some embodiments, the first one or more overhead messages sent by the base station may be the same one or more overhead messages received by the mobile device, e.g., including the same at least one parameter.

The first one or more overhead messages may include configuration messages from the base station to the mobile device. These overhead or configuration messages may include information critical to communication between the base station and the mobile device, e.g., according to the communication protocol being used. In some embodiments, the first one or more overhead messages may also include paging information, e.g., may notify the mobile device of an incoming communication, such as an incoming phone call. Thus, the first one or more overhead messages may be sent relatively frequently (e.g., so that the mobile device doesn't miss an incoming call), e.g., once every 1.25 seconds. The first one or more overhead messages might include, according to one protocol, one or more of: a "system parameter message" (including, e.g., identification information for the base station, such as a base station ID, latitude and longitude of the base station, etc.); a "CDMA channel list" (including, e.g., a list of Code Division Multiple Access (CDMA) channels which the mobile may use); a "neighbor list message" (including, e.g., a list of neighboring base stations which are also within range of the mobile device); and an "extended system parameter message" (including, e.g., additional system parameters, such as at least one parameter which can be used to schedule a second one or more messages, e.g., to be received less frequently than the first overhead message(s)) Any number of other messages, in addition to or instead of any of the messages described above, are also possible; it should also be noted that any of the messages described above may also include other information in addition to or instead of the information described above.

In 204, the base station sends a second one or more messages to the mobile device, according to a schedule based on the at least one parameter. In 304, the mobile device receives a second one or more messages from the base station, according to a schedule based on the at least one parameter. As in step 202 and 302, the second one or more messages may be the same messages in both 204 and 304. Thus the base station may schedule sending the second message(s) based on the parameter(s) sent in the first message(s), while the mobile device may calculate when the second message(s) are scheduled to arrive based on the parameter(s) received in the first message(s).

The second one or more messages may, in some embodiments, be non-critical to communication between the base station and the mobile device. However, in other embodiments, the second one or more messages may also be critical to communication between the base station and the mobile device, but may simply not need to be sent (e.g., updated) as often as the first one or more overhead messages. In general, the content of the second one or more messages may be such that some benefit would be derived if the second one or more messages are sent from the base station to the mobile device less frequently than the first one or more overhead messages are sent from the base station to the mobile device.

If the second one or more messages are sent less frequently than the first one or more overhead messages, the mobile device may not need to spend as much time actively receiving the first one or more overhead messages as if the second one or more messages were included with the first one or more overhead messages. This would allow the mobile device to begin transmitting information (e.g., to set up an outgoing phone call or other outgoing communication) back to the base station sooner (e.g., in embodiments where the mobile device needs the first one or more overhead messages to be updated or current before it can being transmitting). This would also allow the mobile device to spend a longer time in sleep mode before the next timeslot scheduled for receiving the first one or more overhead messages. In particular, if the second one or more messages are sent and received according to a schedule based on a known parameter (e.g., the parameter(s) included in the first overhead message(s)), the mobile device can schedule a sleep cycle (its slotted mode operation) at least partially based on that parameter. This may allow the mobile device to allocate the maximum time to sleep mode while still receiving all messages and pages from the base station. Thus, sending the second one or more messages less frequently, and in particular sending the second one or more messages according to a schedule based on a scheduling parameter sent with the first message(s), may improve both battery life and performance of the mobile device.

In some embodiments, the second one or more messages may be messages related to access point base stations. For example, in one embodiment, the second one or more messages might include a message identifying whether there is an access point base station within range of the mobile device (referred to herein as an "access point pilot information message"), and a message identifying the access point base station within range (if there is one) of the mobile device (referred to herein as an "access point identifier message"). Such messages may thus support the use of access point base stations as part of a cellular network, potentially improving the signal and/or increasing the range of mobile devices within the cellular network. However, it may not be necessary to send these messages to a mobile device as frequently as the configuration messages (e.g., the first one or more overhead messages), thus, they may be suitable to be included in the second one or more messages. Other messages (e.g., including messages not necessarily related to access point base stations) may also or alternatively be sent as part of the second one or more messages. An example of one such message is an "OtherTechnologyNeighborList" message, which, for example, might include information about base stations and/or services of different protocols than the mobile device that are within range of the mobile device. Thus, for example, if a mobile device operates according to CDMA2000 1xRTT, this message might inform the mobile device that there is a GSM base station within range of the mobile device.

In some embodiments, in which the second message(s) are relevant to only some mobile devices (e.g., if they are related to an optional or limited service), separating the second messages may have a further benefit to those mobile devices which cannot or do not use the second message(s). For example, if the second message(s) are related to access point base stations, any mobile device that is not configured for use with access point base stations may be able to ignore the second message(s) entirely, providing further battery savings over the prior art case where all of the overhead messages are sent together in a single block of messages.

As noted above, the second one or more messages may be sent by the base station according to a schedule based on the at least one parameter. In some embodiments, the schedule may also depend on a system clock, e.g., the mobile device and the base station may operate according to a common system time, in which frames of information are sent at specific intervals, such as every 20 ms, 80 ms, or some other interval. In one exemplary embodiment, the formula used to determine when to send the second one or more messages is:

$$T \bmod (APM\_Period) = 0$$

In this example, T is time in units of the system time, and:

$$APM\_Period = 2^{APM\_PeriodIndex} \times 16$$

Where APM_PeriodIndex is included in the first one or more overhead messages, e.g., in the extended system parameter message described above. In one particular embodiment, APM_PeriodIndex might be 4, while T might be 80 ms. Thus in this example, after every 20.48 seconds, the base station may send the second one or more messages to the mobile device. As previously noted, this compares to a typical period of 1.25 seconds (though other periods are also possible) for the first one or more messages; thus, it can be seen that the second message(s) are sent less frequently than the first message(s) in this particular embodiment. It should be noted, however, that while this particular formula for scheduling the second one or more messages is one way to implement this step, other ways of scheduling the second one or more messages based on the at least one parameter are also envisioned.

Figure 4:
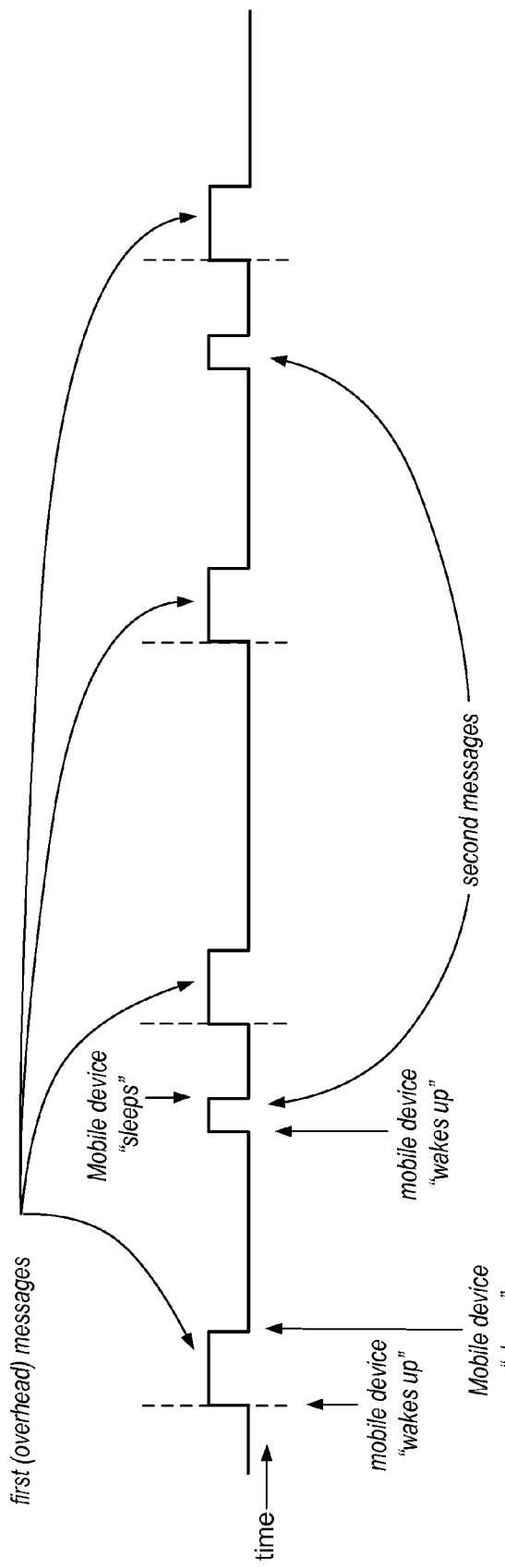
FIG. 4 illustrates the timing of messages sent from a base station to a mobile device according to one embodiment.

FIG. 4—Message Timing Diagram

FIG. 4 illustrates the relative timing of the first one or more overhead messages and the second one or more messages according to one embodiment. The mobile device may be operating in 'slotted mode', where it is only active (and in a high energy use state) during certain timeslots designated for sending or receiving messages. In the remaining timeslots, the mobile device may stay in a lower energy-use state (e.g., in a sleep cycle). Thus, the mobile device may 'wake' at the timeslot designated for the first one or more (overhead) messages, and return to a sleep cycle when all of the first (overhead) message(s) are received. At a later time (which may be determined based on a parameter sent in the first message(s)), the mobile device may 'wake' again to receive the second one or more messages. Alternatively, if the second message(s) are not relevant to the mobile device, the mobile device may be able to continue its sleep cycle through the time slot of the second message(s), providing an additional increase in battery life. For example, in one embodiment the second one or more messages may be access point base station related messages. In this case, only mobile devices that are or configured to utilize access point base stations would need to receive the second messages; any other mobile devices would not be able to use the second message(s). In addition (or instead) of access point base station related messages, the second message(s) may also include any kind of messages; in other words, they are not restricted to being access point base station related messages.

Each type of messages (e.g., first messages and second messages) may be sent (and received) periodically according to a respective period. The periods of the first and second message(s) may be correlated, e.g., they may both be based on a common parameter. In some embodiments, the second message(s) may be sent less frequently than the first message(s); for example, as shown, the second message(s) may be sent half as frequently as the first message(s). In other embodiments, the second message(s) may be sent once for every 4, 8, 10, 16, or any number of times the first message(s) are sent. In an alternate embodiment, the second message(s) may be sent as frequently as the first message(s). It should also be noted that, although the second message(s) are shown as being sent according to a period which is an integer multiple of the period of the first message(s), other relations between the period of the first message(s) and the period of the second message(s) are also possible. It should further be noted that, while in some embodiments the second message(s) may be fewer in number and/or duration than the first message(s), it is also possible that there may be more second message(s) than first message(s), and/or the second message(s) may be longer in duration than the first message(s).

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method for sending messages from a base station to a mobile device, the method comprising:
    sending, by the base station, a first plurality of overhead messages to the mobile device in a wireless fashion, wherein the first plurality of overhead messages are sent according to a first periodic schedule with a first frequency, and wherein at least one of the first plurality of overhead messages comprises at least one parameter;
    sending, by the base station, a second plurality of messages to the mobile device in a wireless fashion, wherein said sending the second plurality of messages is performed according to a second periodic schedule with a second frequency, and wherein the second periodic schedule is based on the at least one parameter, and wherein the second frequency is less than the first frequency; and
    scheduling, by the mobile device, a sleep cycle based on the at least one parameter, thereby reducing battery consumption, wherein the sleep cycle is related to system time and a period parameter included in the at least one parameter, and wherein the sleep cycle is determined as T mod (APM_Period)=0 and APM_Period= $2^{APM\_PeriodIndex} \times 16$, and wherein T is time in units of the system time, and wherein the period parameter is "APM_ PeriodIndex."

2. The method of claim 1, wherein the second plurality of messages inform the mobile device whether a femtocell is within range of the mobile device, wherein the second plurality of messages comprise:
    1) an Access Point Identifier Message indicating the identifier of the femtocell; and
    2) an Access Point Pilot Information Message indicating pilot information of the femtocell.

3. The method of claim 1, wherein the first plurality of overhead messages comprise messages that are critical to communication between the base station and the mobile device, and wherein the second plurality of messages comprise messages that are non-critical to communication between the base station and the mobile device.

4. A base station configured to wirelessly send messages to a mobile device, wherein the base station comprises:
- an antenna for wirelessly sending messages wireless to the mobile device; and
- first logic coupled to the antenna, wherein the first logic is configured to:
  - wirelessly send a first plurality of overhead messages to the mobile device, wherein the first plurality of overhead messages are sent according to a first periodic schedule with a first frequency, wherein at least one of the first plurality of overhead messages comprises at least one parameter; and
  - wirelessly send a second plurality of messages to the mobile device according to a second periodic schedule with a second frequency, wherein the second periodic schedule is based on the at least one parameter, wherein the second frequency is less than the first frequency;
  - wherein the mobile device schedules a sleep cycle based on the at least one parameter, thereby reducing battery consumption, and wherein the sleep cycle is related to system time and a period parameter included in the at least one parameter, and wherein the sleep cycle is determined as $T \mod(APM\_Period)=0$ and $APM\_Period=2^{APM\_PeriodIndex} \times 16$, and wherein T is time in units of the system time, and wherein the period parameter is "APM_PeriodIndex."

5. The base station of claim 4, wherein the second plurality of messages inform the mobile device whether a femtocell is within range of the mobile device, wherein the second plurality of messages comprise:
1) an Access Point Identifier Message indicating the identifier of the femtocell; and
2) an Access Point Pilot Information Message indicating pilot information of the femtocell.

6. The base station of claim 4, wherein the first plurality of overhead messages comprise messages that are critical to communication between the base station and the mobile device, and wherein the second plurality of messages comprise messages that are non-critical to communication between the base station and the mobile device.

7. A method for operating a mobile device, the method comprising:
- receiving, by the mobile device, a first plurality of overhead messages in a wireless fashion, wherein the first plurality of overhead messages are received according to a first periodic schedule with a first frequency, wherein at least one of the first plurality of overhead messages comprises at least one parameter, wherein the first plurality of messages are received from a base station;
- receiving, by the mobile device, a second plurality of messages in a wireless fashion according to a second periodic schedule with a second frequency, wherein the second periodic schedule is determined based on the at least one parameter, wherein the second frequency is less than the first frequency, wherein the second plurality of messages are received from the base station; and
- scheduling, by the mobile device, a sleep cycle based on the at least one parameter, thereby reducing battery consumption, wherein the sleep cycle is related to system time and a period parameter included in the at least one parameter, and wherein the sleep cycle is determined as $T \mod (APM\_Period)=0$ and $APM\_Period=2^{APM\_PeriodIndex} \times 16$, and wherein T is time in units of the system time, and wherein the period parameter is "APM_ PeriodIndex."

8. The method of claim 7, wherein the second plurality of messages inform the mobile device whether a femtocell is within range of the mobile device, wherein the second plurality of messages comprise:
1) an Access Point Identifier Message indicating the identifier of the femtocell; and
2) an Access Point Pilot Information Message indicating pilot information of the femtocell.

9. The method of claim 7, wherein the first plurality of overhead messages comprise overhead messages that are critical to communication between the base station and the mobile device, and wherein the second plurality of messages comprise messages that are non-critical to communication between the base station and the mobile device.

10. A mobile device configured to wirelessly receive messages from a base station, wherein the mobile device comprises:
- an antenna for wirelessly receiving messages from the base station; and
- first logic coupled to the antenna, wherein the first logic is configured to:
  - wirelessly receive a first plurality of overhead messages from the base station, wherein the first plurality of overhead messages are received according to a first periodic schedule with a first frequency, wherein at least one of the first plurality of overhead messages comprises at least one parameter;
  - wirelessly receive a second plurality of messages from the base station according to a second periodic schedule with a second frequency, wherein the second periodic schedule is determined based on the at least one parameter, wherein the second frequency is less than the first frequency; and
  - schedule a sleep cycle based on the at least one parameter, thereby reducing battery consumption, wherein the sleep cycle is related to system time and a period parameter included in the at least one parameter, and wherein the sleep cycle is determined as $T \mod(APM\_Period)=0$ and $APM\_Period=2^{APM\_PeriodIndex} \times 16$, and wherein T is time in units of the system time, and wherein the period parameter is "APM_PeriodIndex."

11. The mobile device of claim 10, wherein the second plurality of messages inform the mobile device whether a femtocell is within range of the mobile device, wherein the second plurality of messages comprise:
1) an Access Point Identifier Message indicating the identifier of the femtocell; and
2) an Access Point Pilot Information Message indicating pilot information of the femtocell.

12. The mobile device of claim 10, wherein the first plurality of overhead messages comprise overhead messages that are critical to communication between the base station and the mobile device, and wherein the second plurality of messages comprise messages that are non-critical to communication between the base station and the mobile device.

* * * * *